United States Patent
Ogawa et al.

(10) Patent No.: US 7,600,236 B2
(45) Date of Patent: Oct. 6, 2009

(54) DISK-SHAPED STORAGE MEDIUM LOADING/EJECTION MECHANISM, DISK DEVICE, AND DISK AUTOCHANGER

(75) Inventors: Kouichi Ogawa, Kobe (JP); Fumihiko Fujimoto, Kobe (JP); Yasutake Yamanaka, Kobe (JP); Kenichi Hatata, Kobe (JP)

(73) Assignees: Fujitsu Ten Limited, Kobe-shi, Hyogo (JP); Muramoto Industry Co., Ltd., Kobe, Hyogo (JP)

( * ) Notice: Subject to any disclaimer, the term of this patent is extended or adjusted under 35 U.S.C. 154(b) by 519 days.

(21) Appl. No.: 11/362,293

(22) Filed: Feb. 23, 2006

(65) Prior Publication Data
US 2006/0190950 A1 Aug. 24, 2006

(30) Foreign Application Priority Data
Feb. 24, 2005 (JP) .............................. 2005-049099
Feb. 8, 2006 (JP) .............................. 2006-031490

(51) Int. Cl.
*G11B 17/04* (2006.01)
(52) U.S. Cl. ..................................................... 720/623
(58) Field of Classification Search ................ 720/623, 720/612, 604, 646, 624, 621, 600, 619, 609, 720/626, 711, 644, 625
See application file for complete search history.

(56) References Cited

U.S. PATENT DOCUMENTS

| 5,204,849 | A | * | 4/1993 | Yamada et al. ............... 720/623 |
| 5,719,844 | A | | 2/1998 | Abe |
| 2003/0165104 | A1 | | 9/2003 | Shimozaki |
| 2004/0098735 | A1 | * | 5/2004 | Kim et al. ................... 720/612 |
| 2004/0098736 | A1 | * | 5/2004 | Kim et al. ................... 720/612 |

FOREIGN PATENT DOCUMENTS

CN 1441426 A 9/2003
JP 2001-76408 3/2001

OTHER PUBLICATIONS

Patent Certificate for corresponding Chinese Patent No. CN 100476970C which cites the above-identified listed references.
Patent Abstract of Japan, Publication No. 2001076408 A, published Mar. 23, 2001, in the name of Ootsu, et al.

* cited by examiner

*Primary Examiner*—Allen T Cao
(74) *Attorney, Agent, or Firm*—Christie, Parker & Hale, LLP

(57) ABSTRACT

A disk loading/ejection mechanism in a disk device inserting and taking out a disk-shaped storage medium (disk D) through an opening and enabling a combined relatively large space to be secured inside the disk device, provided with an offset drive function unit for shifting the loading/ejection direction when inserting and taking out the disk D to a loading/ejection direction (B) offset from the straight direction (A) perpendicularly intersecting the opening direction of the opening.

27 Claims, 17 Drawing Sheets

DISK-SHAPED STORAGE MEDIUM LOADING/EJECTION MECHANISM, DISK DEVICE, AND DISK AUTOCHANGER

CROSS-REFERENCE TO RELATED APPLICATION

This application claims priority of Japanese Patent Application Number 2005-049099, filed on Feb. 24, 2005, and Japanese Patent Application Number 2006-031490, flied on Feb. 8, 2006.

BACKGROUND OF THE INVENTION

1. Field of the Invention

The present invention relates to a mechanism for loading a disk-shaped storage medium into a housing through an opening and for ejecting the disk-shaped storage medium from that housing through that opening, that is, a loading/ejection mechanism, and a disk device and a disk autochanger having that loading/ejection mechanism.

2. Description of the Related Art

There are a great variety of disk-shaped storage media on the market. Below, specific types of these, that is, CDs and MDs, will be used as examples for the explanation. CDs and other disk-shaped storage media (hereinafter simple referred to as "disks" in some cases) are usually loaded into a disk player of an audio system etc. to provide the user with music. In this case, if the display player is a disk autochanger, it stores a plurality of disks in its housing and automatically selects one disk at a time in a preferred order so as to provide the user with music.

In this way, to play music from a CD etc., a disk player or a disk autochanger is essential. In this case, the disk player etc. is defined in shape by its housing. It requires an opening for inserting and taking out disks to and from the housing and a disk loading/ejection mechanism provided near it.

FIG. 14 is a view of an example of a general disk loading/ejection mechanism and a disk device provided with the same.

In the figure, the disk device 1 has a disk loading/ejection mechanism 2 for loading a disk D into the housing 4 (IN) or for ejecting it from the housing 4 (OUT). This disk loading/ejection mechanism is provided near an opening 3 formed at part of the housing 4 and is for example comprised of a loading/ejecting roller 2a and a support plate 2b paired with this.

Each disk D loaded from the opening 3 by the disk loading/ejection mechanism 2 into the housing 4 is stored in a disk holding member 5. Note that this figure shows a disk device 1 constituted by a disk autochanger. There are six disk holding members 5 for hold six stacked disks in the illustration.

When one of the six stacked disks D is selected, a separating means (not shown) is inserted between the holding member 5 storing the selected disk D and an adjoining holding member 5 to push the two apart. A playback (recording) pickup is inserted between them for playing back or recording on the disk.

FIG. 15 is a plan view showing the configuration of the main parts of FIG. 14 in a simplified manner.

In FIG. 15, the disk loading/ejection mechanism 2, housing 4, and disk holding members 5 shown in FIG. 14 are shown simply with the disk D being taken out. Note that to facilitate understanding, parts which are originally not visible are also all drawn by solid lines.

As clear from the following explanation, the point of the disk loading/ejection mechanism 2 in the disk device 1 according to the present invention is that the loading/ejection direction of the disk D is not straight as shown by the arrow A in FIG. 15, but is offset as shown by the arrow B of the figure.

Note that as known art where the direction of transport of the disk D is partially not straight, there is Japanese Patent Publication (A) No. 2001-76408.

FIGS. 16A and 16B are a perspective view and plan view of the device disclosed in Japanese Patent Publication (A) No. 2001-76408.

Referring to FIGS. 16A and 16B, according to Japanese Patent Publication (A) No. 2001-76408, there is provided a data storage medium drive device where even if part of a small sized data storage medium happens to fall inside from the opening of a loading tray, it will not be caught up in the internal mechanism and can be reliably unloaded and ejected. The configuration and effects are as follows.

A guide member 103 is formed at a position of an offset side 102a of an opening 102 of a loading base 101. Due to this, when moving in the unloading direction, even if a small sized optical disk D would be liable to fall into the space between a loading tray 104 and a receiving surface 105 of the loading base 101 from the offset side 102a of the opening 102, in the process of moving in the unloading direction, the falling side of the optical disk will run up against the guide member 103 and forcibly be moved toward the center, therefore the disk D will be able to be made to move in the ejection direction in a more horizontal state along the medium tray surface. Due to this, the disk D will not be caught up in the gears and other internal mechanisms of a gear unit 106 and will be able to be reliably ejected.

As shown in the figures, Japanese Patent Publication (A) No. 2001-76408 discloses changing the direction of transport of the disk D from a straight direction near the opening 102 toward the center as shown by D' at the time of ejection of the disk D.

FIGS. 17A and 17B are views for explaining the problems to be solved by the invention. FIG. 17A corresponds to FIG. 15

The disk device 1, for example, the disk autochanger, is comprised of a large number of complicated component parts, The housing 4 shown in FIGS. 16A and 16B, while not shown, actually has these component parts fit inside it.

This large number of component parts is arranged in spaces other than the locations of the disk holding members 5, the disks D, and the playback (recording) pickup PU in FIG. 14.

Here, referring to FIG. 17A, the spaces S1, S2, S3, and S4 are shown. These spaces S1 to S4, as clear from the figure, are dispersed in the four directions. Further, they have small areas. Therefore, when laying out the component parts in the housing, consideration restrictions are imposed. Accordingly, a certain degree of freedom of layout is lost. This in turn obstructs the reduction of size of the disk device 1.

In view of these problems, the present assignee previously proposed the layout shown in FIG. 17B. That is, it proposed to shift the disk holding members 5 and the loading/ejection mechanism 2 from the center of the disk device 1 to either the left or right side (in the figure, the right side).

Due to this, the spaces S1 and S2 and the spaces S3 and S4 shown in FIG. 17A become the space "S1+S2" and the space "S3+S4" of FIG. 17B. By enabling such combined large spaces to be secured in this way, the degree of freedom of layout is improved.

According to the layout of FIG. 17B, however, the opening 3 through which the disk D is inserted and taken out is naturally shifted in position from the center to one side (right side). This first of all causes the problem of poor user friendliness and second causes the problem of an odd feeling in the design as viewed from the front of the disk device 1.

SUMMARY OF THE INVENTION

An object of the present invention is to provide a loading/ejection mechanism for a disk-shaped storage medium enabling various component parts to be laid out in a disk device 1 relatively freely by securing a large space at one side of the housing and enabling an opening 3 for inserting and taking out the disk at the center of the front of the housing as in the past.

To attain the above object, according to the present invention, there is provided a loading/ejection mechanism for inserting and taking out a disk-shaped storage medium (disk D) through an opening, provided with an offset drive function unit (10) for shifting the loading/ejection direction when inserting and taking out the disk D to a loading/ejection direction (B) offset from the straight direction (A) perpendicularly intersecting the opening direction of the opening (3).

BRIEF DESCRIPTION OF THE DRAWINGS

These and other objects and features of the present invention will become clearer from the following description of the preferred embodiments given with reference to the attached drawings, wherein:

FIG. 6A is a front view showing a pair of a holding roller and a left-right symmetrical drive roller, while

FIG. 11A is a plan view of the second embodiment of the present invention, while

FIG. 12A is a plan view of a modification of the second embodiment of the present invention, while

DESCRIPTION OF THE PREFERRED EMBODIMENTS

Preferred embodiments of the present invention will be described in detail below while referring to the attached drawings.

Figure 1:
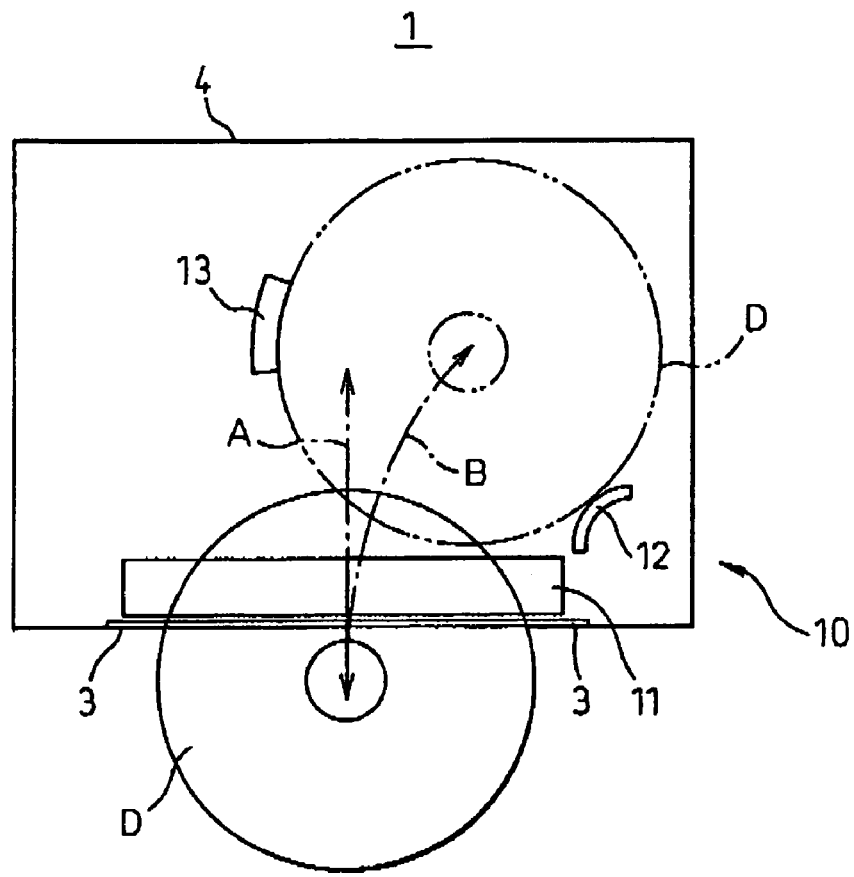
FIG. 1 is a view of the basic configuration of a loading/ejection mechanism according to the present invention.
Figure 2:
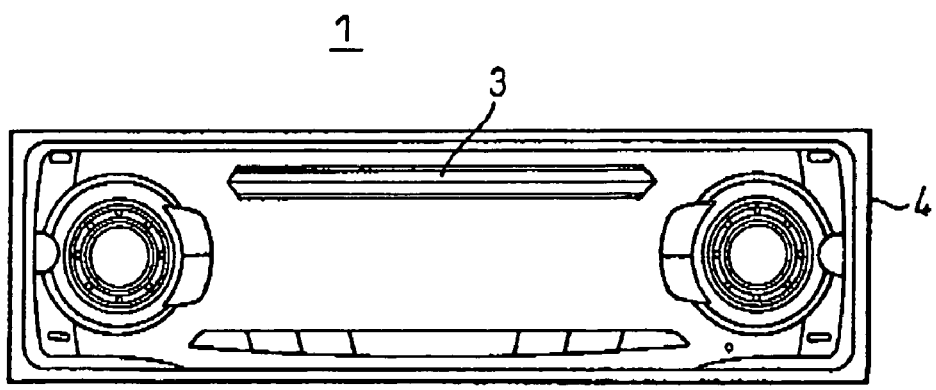
FIG. 2 is a view showing an example of a disk device provided with the loading/ejection mechanism according to the present invention as seen from the front.

FIG. 1 is a plan view of the basic configuration of a loading/ejection mechanism according to the present invention. FIG. 2 is a view of an example of a disk device provided with the loading/ejection mechanism according to the present invention as seen from the front. As explained above, the opening 3 for inserting and taking out the disk D is shown arranged at the center of the front of the housing 4 as in the past.

The loading/ejection mechanism shown in the drawings is basically a loading/ejection mechanism for inserting and taking out a disk-shaped storage medium D through the opening 3 formed in part of the housing 4 and is characterized by the provision of an offset drive function unit 10.

The offset drive function unit 10 shifts the loading/ejection direction when inserting and taking out a disk-shaped storage medium D through the opening 3 to a loading/ejection direction B offset from a straight direction A perpendicularly intersecting the opening direction of the opening 3 (left-right direction in figure). This loading/ejection direction B is preferably a substantially arc shape when viewed from a plan view, but is not limited to this and may be a multiply bent shape as well.

The offset drive function unit 10 first of all has an offset loading/ejection drive part 11 as its main part. Preferably, it cooperates with an inside movement limiting function unit 12. More preferably, it cooperates with an outside movement limiting function unit 13 as well.

These inside movement limiting function unit 12 and outside movement limiting function unit 13 function to correct movement of the disk D so as to make the loading/ejection path of the disk D accurately match with the arrow mark B in FIG. 1.

According to the present invention, the conventional idea of having the disk D proceed straight after passing through the opening 3 is overturned. Instead, a loading/ejection mechanism is realized which enables the disk D to be transported curved inside the housing 4. Further, a disk device and a disk autochanger provided with such a loading/ejection mechanism are realized.

Due to this curved movement of the disk D, the opening 3 is kept provided at the center of the front of the housing as in the past. At the same time, it becomes possible to secure a combined relatively large space in the housing. In this case, the space occupied by the offset drive function unit 10 of the present invention (and further the inside and outside movement limiting function units 12 and 13) is substantially the same as the space occupied by the conventional disk loading/ejection mechanism 2, so this combined relatively large space is not cancelled out by the introduction of the function unit 10 (and 11 and 12) of the present invention at all.

Figure 17A:
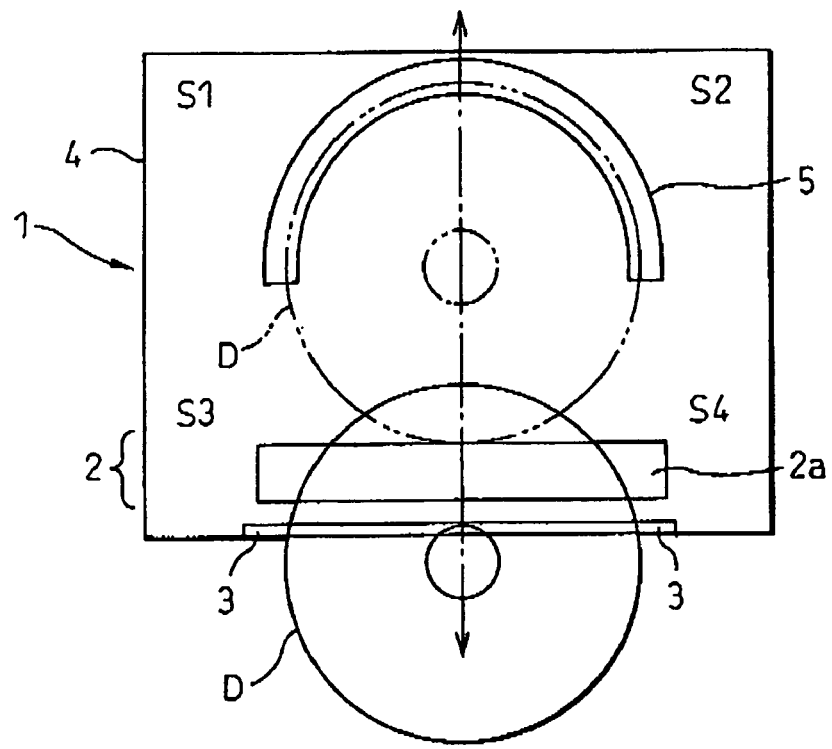
FIGS. 17A and 17B are plan views for explaining the problem to be solved by the present invention.
Figure 17B:
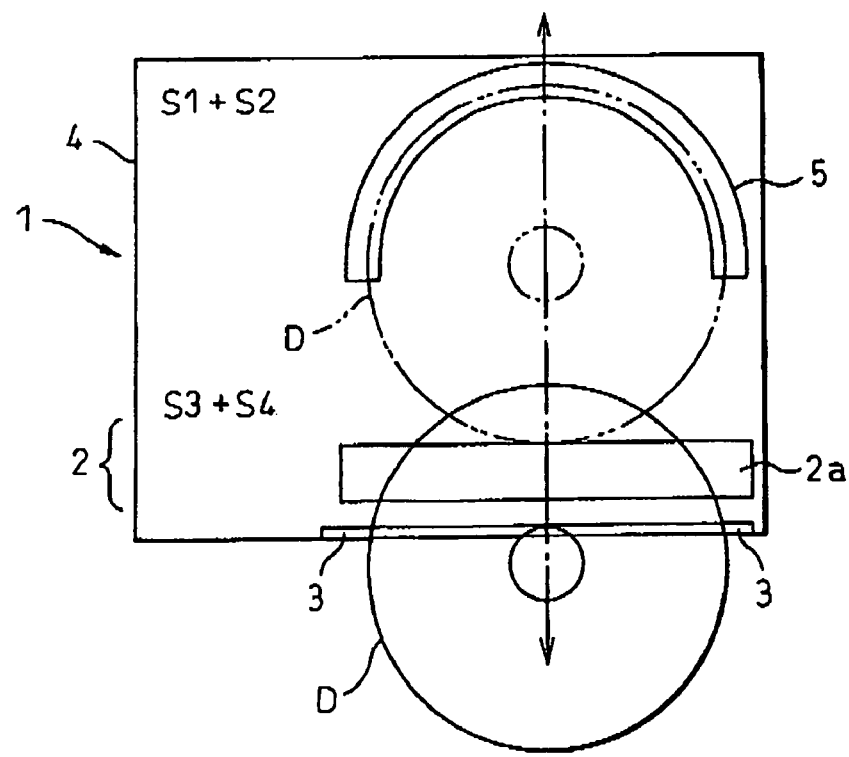
Figure 18:
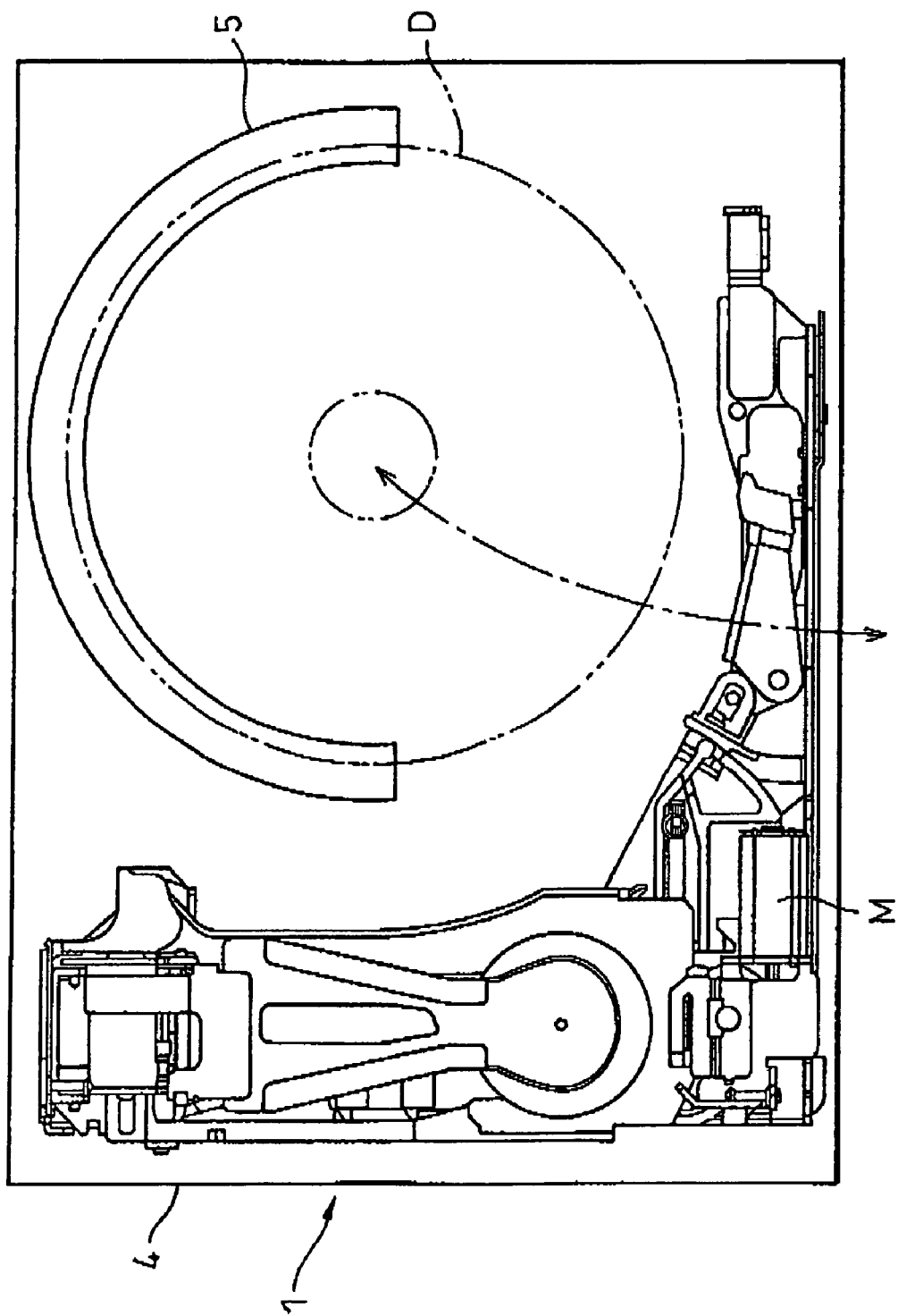
FIG. 18 is a plan view of a specific example of fitting the required component parts into the spaces shown in FIG. 1.

Illustrating the above spaces, FIG. 18 is a plan view showing a specific example of fitting the required component parts into the spaces shown in FIG. 1. That is, the spaces "S1+S2" and "S3+S4" (see FIG. 17B) hold, if applied to a disk changer, a drive mechanism of a swing arm, an electronic control circuit board for control of the swing arm, control of signals input to the pickup (PU), etc., a drive motor M, etc. and the loading/ejection mechanism.

Accordingly, the above combined relatively large space enables the limitations on layout of the large number of component parts to be greatly eased and as a result facilitates realization of a smaller sized disk device or disk autochanger.

First Embodiment

Figure 3:
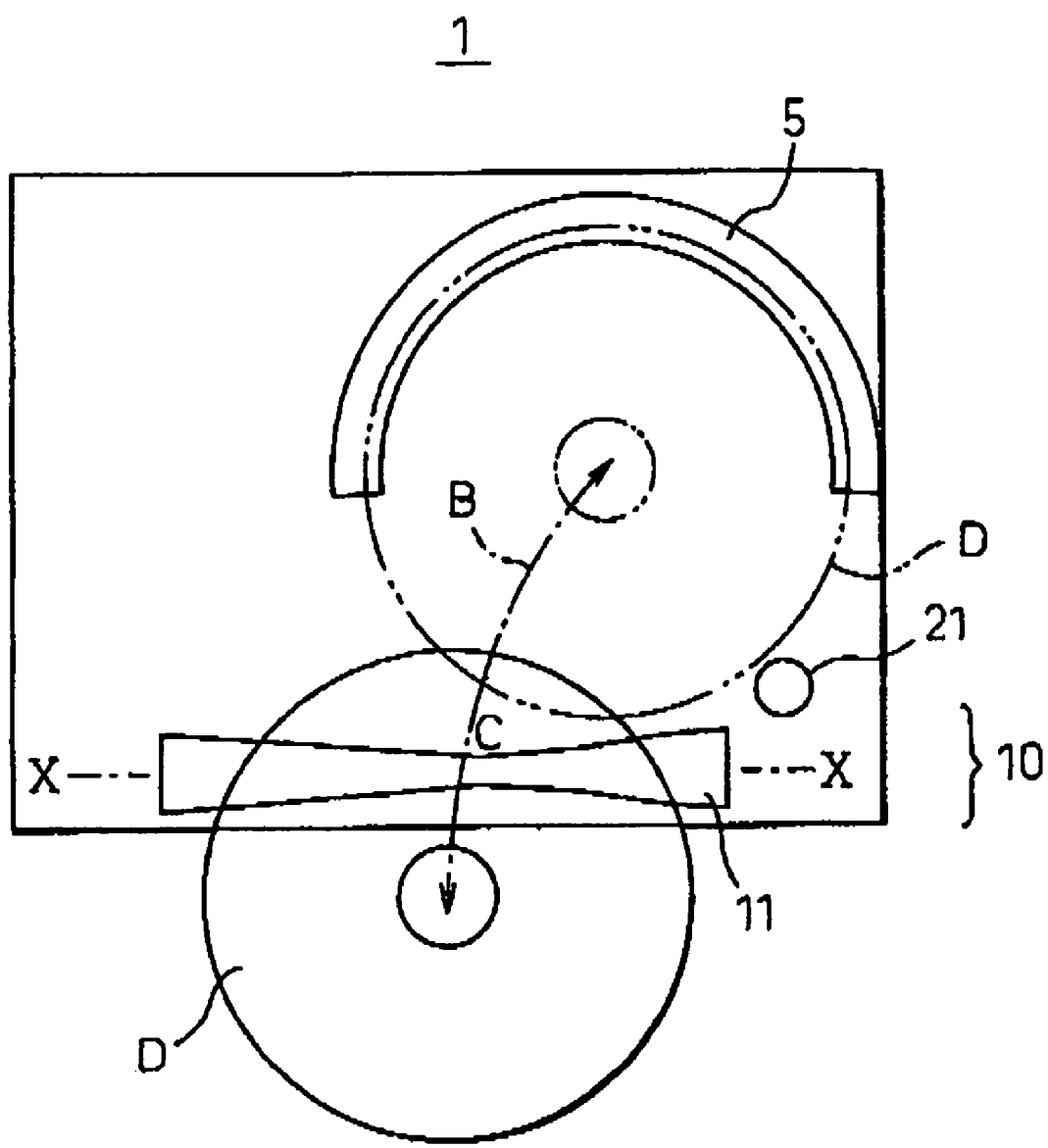
FIG. 3 is a plan view of a first embodiment of the present invention.
Figure 4:
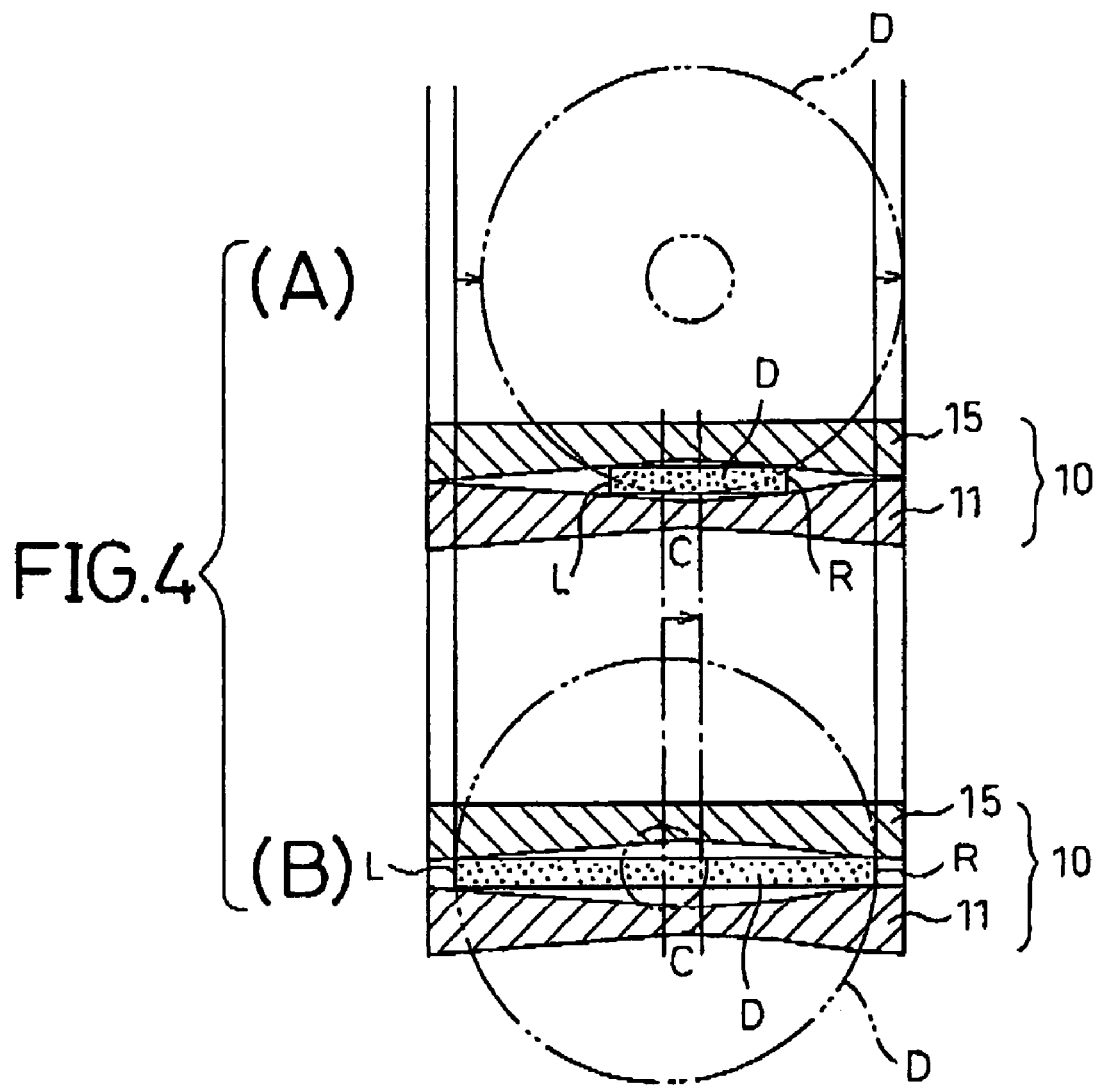
FIGS. 4A and 4B are views of two loading/ejecting stages in FIG. 3 seen from the front.
Figure 14:
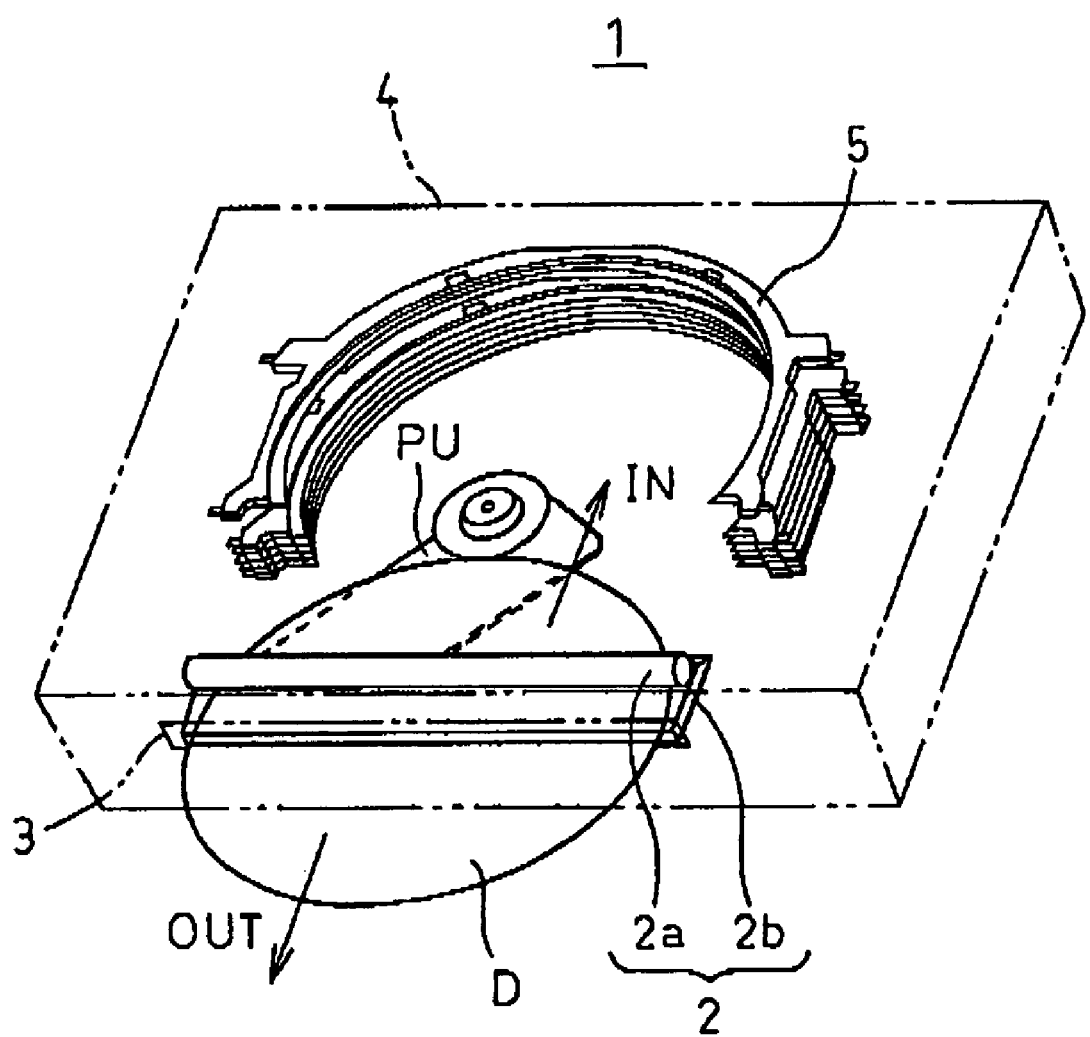
FIG. 14 is a view of an example of a general disk loading/ejection mechanism and a disk device provided with the same.
Figure 15:
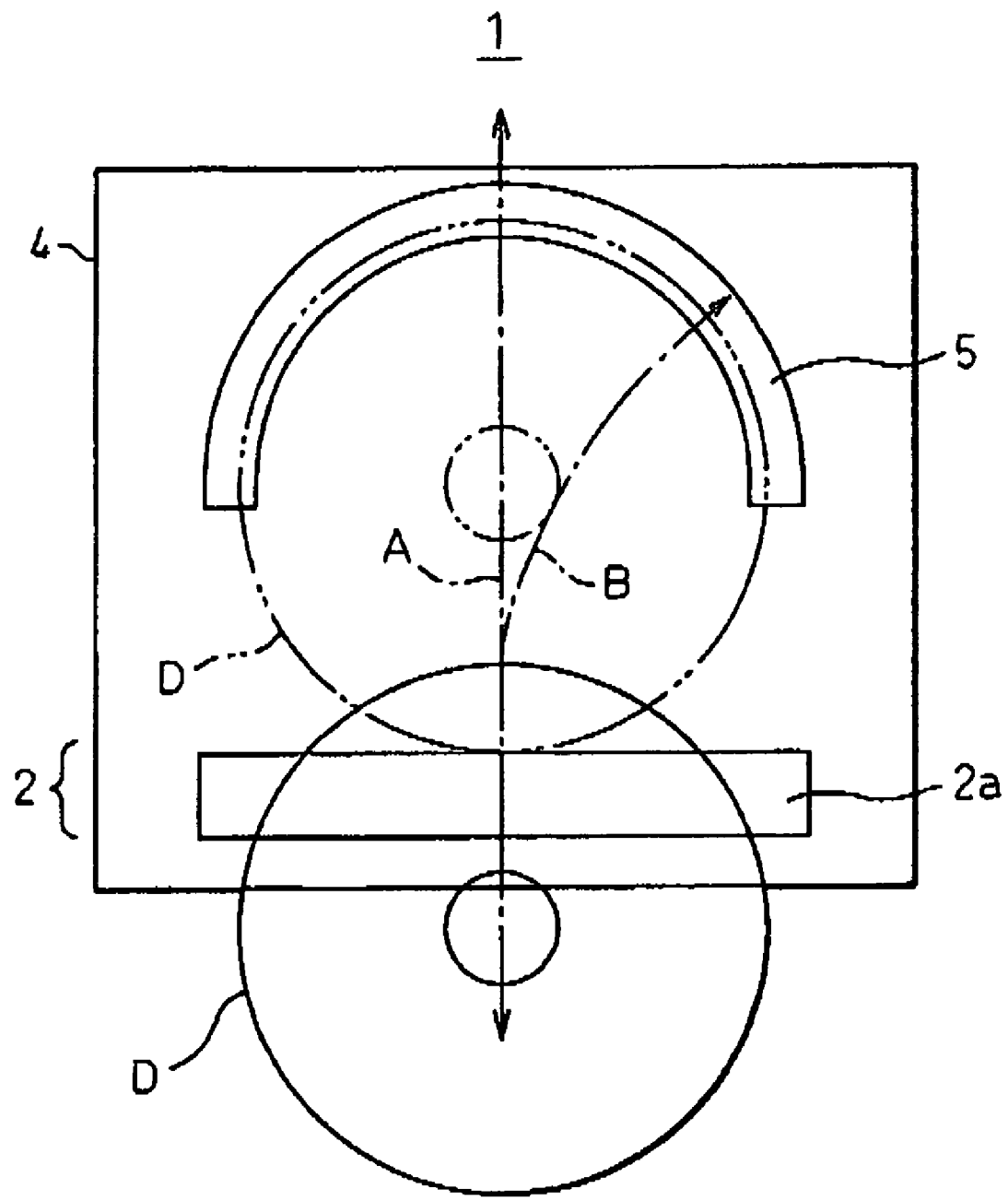
FIG. 15 is a simplified view of the configuration of principal parts of FIG. 14.
Figure 16A:
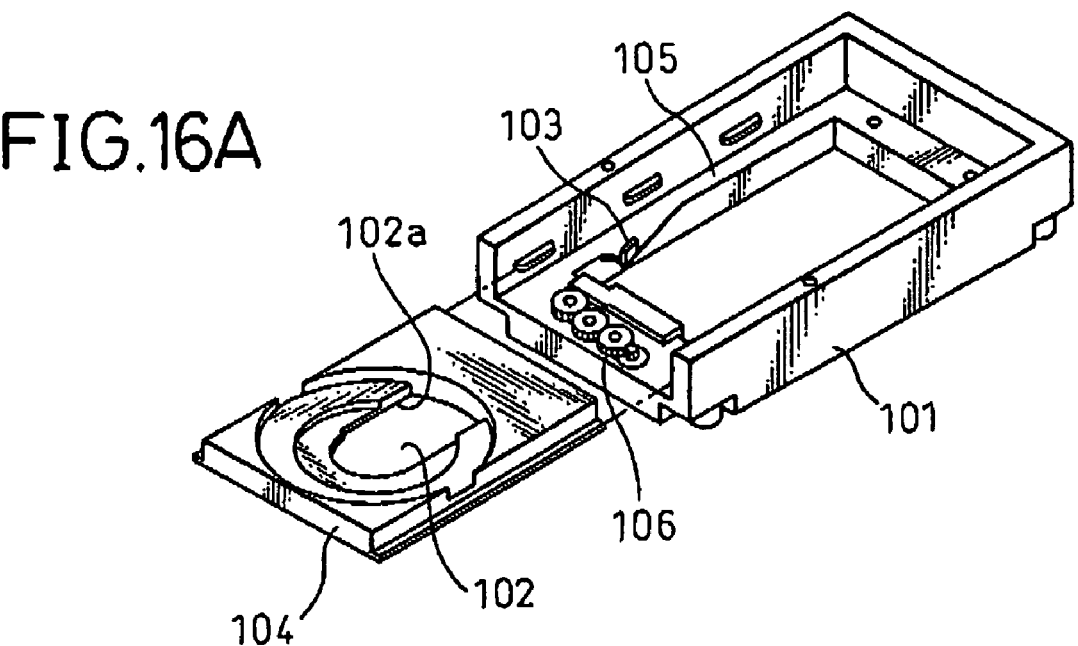
FIGS. 16A and 16B are a perspective view and plan view of a device disclosed in Japanese Patent Publication (A) No. 2001-76408.
Figure 16B:
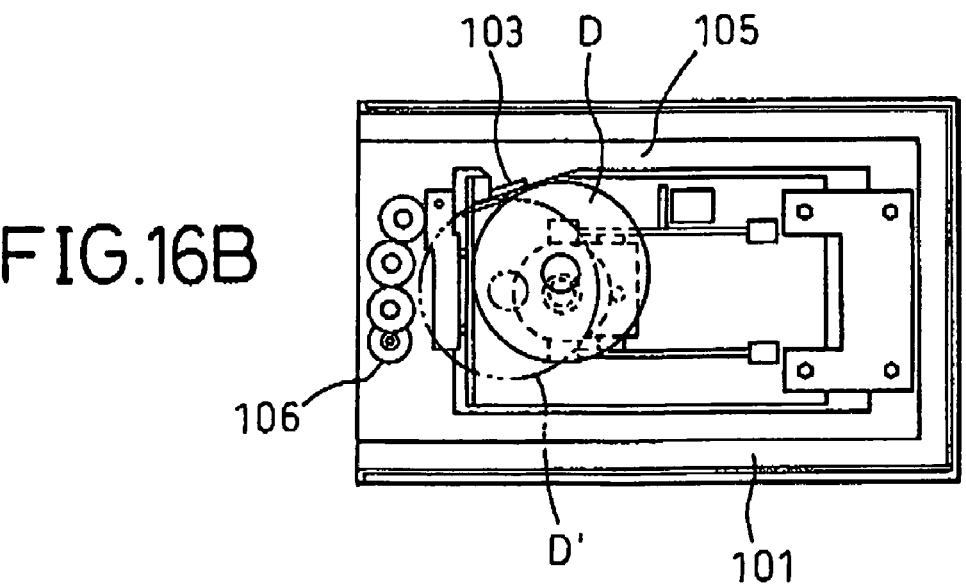

FIG. 3 is a plan view of a first embodiment of the present invention. FIGS. 4A and 4B are views of two loading/ejection stages in FIG. 3 as seen from the front. In FIGS. 4A and 4B, however, to enable the positions of the disk D at each of the two loading/ejection stages to be easily understood, the disk D is drawn together in a plan view by two-dot chain lines. FIG. 4B shows the stage where the center of the disk D passes through the opening (3 of FIG. 14). Next, the stage where the disk D is loaded into the housing 4 is shown by FIG. 4A. In FIG. 4A, the state of the center of the disk D being shifted to the right compared with FIG. 4B will be understood from the right direction arrow mark in the figure.

These FIGS. 4A and 4B show the holding part 15 not shown in FIG. 3.

First, the points of the present invention will be summarized:
 (i) The offset drive function unit 10 has an offset loading/ejection drive part for giving the drive force for inserting and taking out a disk-shaped storage medium D. Here, the offset loading/ejection drive part is comprised of a drive roller. The drive roller is given a substantially V-sectional shape where the radius of the drive roller is gradually increased from the center toward the left and right along the axial direction. Here,
 (ii) the substantially V-sectional shape of the drive roller is made a shape left-right asymmetric from the center or
 (iii) the substantially V-sectional shape of the drive roller is made a shape left-right symmetric to from the center.
Still further,
 (iv) The offset drive function unit 10 has a holding part 15 paired with the drive roller and holding the disk-shaped storage medium D in a transportable manner. The holding part also has a substantially V-sectional shape at the side facing the drive roller. Here,
 (v) the substantially V-sectional shape of the holding part 15 is made a shape left-right asymmetric from the center or
 (vi) the substantially V-sectional shape of the holding part 15 is made a shape left-right symmetric from the center.

Referring to FIG. 3 and FIGS. 4A and 4B, more specifically, the offset drive function unit 10 is comprised by an offset loading/ejection drive part 11 giving a drive force for inserting or taking out the disk-shaped storage medium D. Here, the radius of the drive roller forming this offset loading/ejection drive part 11 is gradually increased the further from the center C to the left side and the right side along the X-X axial direction (FIG. 3). Further, the increase is made left-right asymmetric from the center C.

The offset drive function unit 10 preferably includes a holding part 15 paired with the offset loading/ejection drive part 11 and holding the disk-shaped storage medium D in a transportable manner.

Here, the sectional shape of the holding part 15 at the vertical plane passing through the axis X-X of the offset loading/ejection drive part 11 is made substantially symmetric with the sectional shape of the offset loading/ejection drive part 11 along the vertical plane.

This holding part 15 may be a plate shape or a roller shape like with a holding plate or a holding roller.

This holding part 15 and the offset loading/ejection drive part 11 will be explained in a bit more detail.

Figure 5:
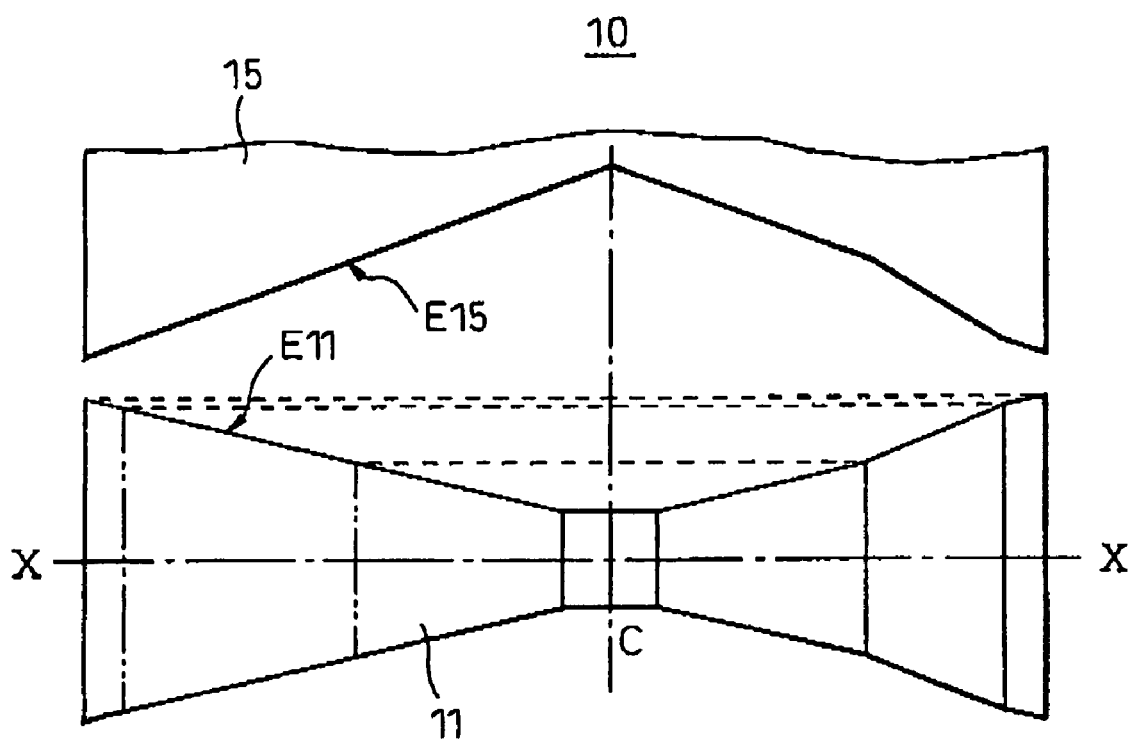
FIG. 5 is a detailed enlarged front view of an offset loading/ejecting drive part 11 and a holding part 15.

FIG. 5 is a detailed enlarged front view of the offset loading/ejection drive part 11 and the holding part 15.

The offset loading/ejection drive part (drive roller) 11 shown in FIGS. 4A and 4B has, in the first embodiment, a maximum diameter of for example about 4 mm, a minimum diameter of for example about 1 mm, and an axial (X-X) direction length of for example about 12 cm. On the other hand, as the holding part 15, part of a holding roller is shown.

According to FIGS. 4A and 4B, the radius of the drive roller 11 (holding roller 15 as well) gradually increases the further from the center C to the left side and the right side. The increase is asymmetric with respect to the center C in this illustration.

When making the pair of rollers (11, 15) with the left-right asymmetric shapes shown in FIG. 5 grip the disk D (FIGS. 4A and 4B) and move the disk D forward, as shown in FIG. 3, the disk D proceeds curved as in FIG. 4B. The reason is that a force is at work trying to maintain the disk D horizontal at all times. Conversely speaking, even if trying to tilt the disk D for example 5 degrees (or 10 degrees or 20 degrees) from the horizontal state (0 degree) shown in FIGS. 4A and 4B, that tilted state will never be possible. If forcibly trying to obtain that state, the disk D or one of the rollers will end up breaking.

Therefore, as explained above, the disk proceeds while maintaining a horizontal state at all times as shown by FIGS. 4A and 4B.

Maintaining the disk D in the horizontal state in this way means that no matter what position of the pair of rollers (11, 15) the disk D is at, the left end L and the right end R of the disk D (for L and R, see FIGS. 4A and 4B) have to be held by the same width at all times (width between pair of rollers).

However, in maintaining the same width, as explained above, since the width between the rollers is not left-right symmetric, the disk D will not proceed straight no matter what. The path of the disk D will end up being bent by exactly the amount of deviation of the width due to the left-right asymmetry.

Therefore, the envelope shape E11 of the drive roller 11 and the envelope shape E15 of the holding roller 15 are determined by what kind of loading/ejection path (B in FIG. 1 and FIG. 3) is drawn in the housing 4 by the disk D.

The above explanation was made assuming that both the drive roller and the holding roller 15 forming the offset loading/ejection drive part 11 were left-right asymmetric from the centers, but the invention is not actually limited to this. The drive roller may also be made left-right symmetric (leaving the holding roller left-right asymmetric). In this case, however, the offset drive function unit 10 has to be further provided with a pressing part for giving a pressing force so as to grip the disk D with the holding part while holding the offset loading/ejection drive part 11 parallel with the holding part 15.

Figure 6A:
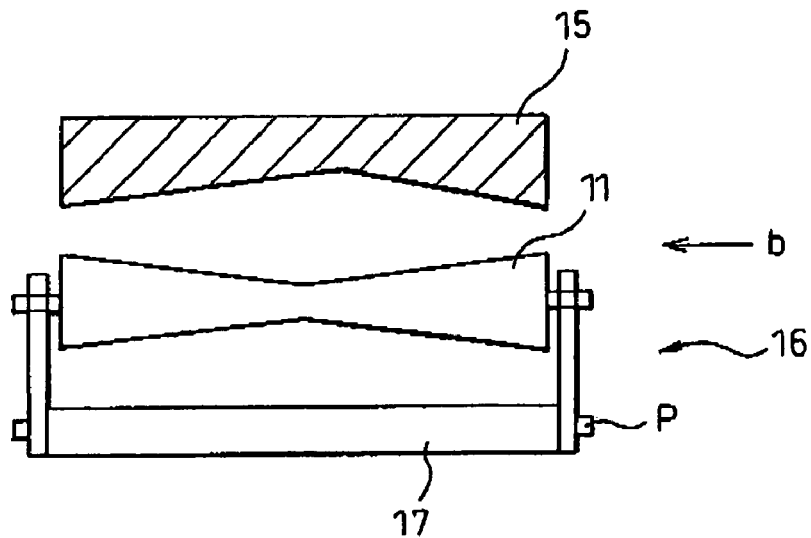
Figure 6B:
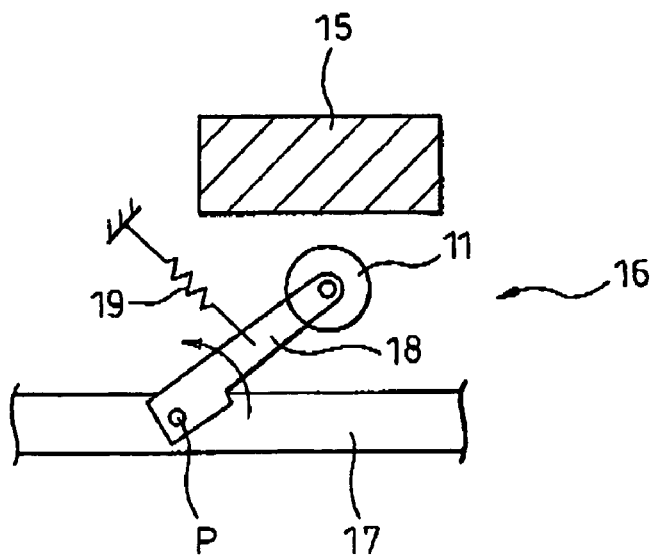
FIG. 6B is a side view along the arrow b.

FIG. 6A is a front view of the pair of the holding roller and the left-right symmetric drive roller, while FIG. 6B is a side view along the arrow b in FIG. 6A.

In FIGS. 6A and 6B, the pressing part is shown by reference numeral 16. As one example, it is comprised of a base chassis 17, a lever 18 gripped swingably about a pin P at the chassis 17, and a spring 19 lifting up the lever 18 together with the drive roller 11. Therefore, the drive roller 11 can move up and down parallel with the pressing part 15 at all times in the base chassis 17.

Figure 7A:
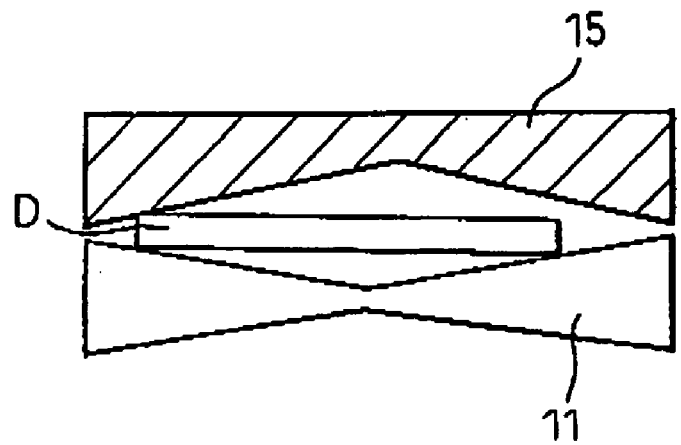
FIGS. 7A and 7B are views for explaining the operation in the case of the configuration of FIGS. 6A and 6B.
Figure 7B:
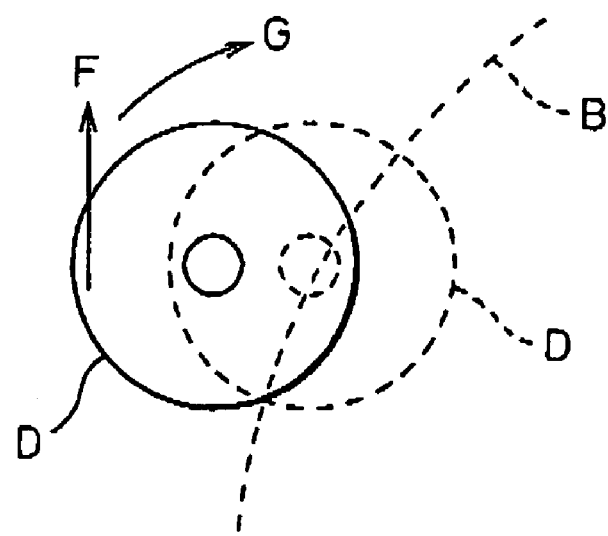

FIGS. 7A and 7B are views for explaining the operation of the configuration of FIGS. 6A and 6B.

In FIGS. 7A and 7B, when the disk D is about to deviate from the intended path B, just the side about to deviate (in the figures, the left end of the disk D) is gripped by the drive roller 11 and the holding part 15 by the force of the spring 19. Only the left end of the disk D receives force in the direction of the arrow mark F. As a result, moment of the arrow mark G is generated. Due to this G, the disk D moves in the intended direction B.

Figure 8:
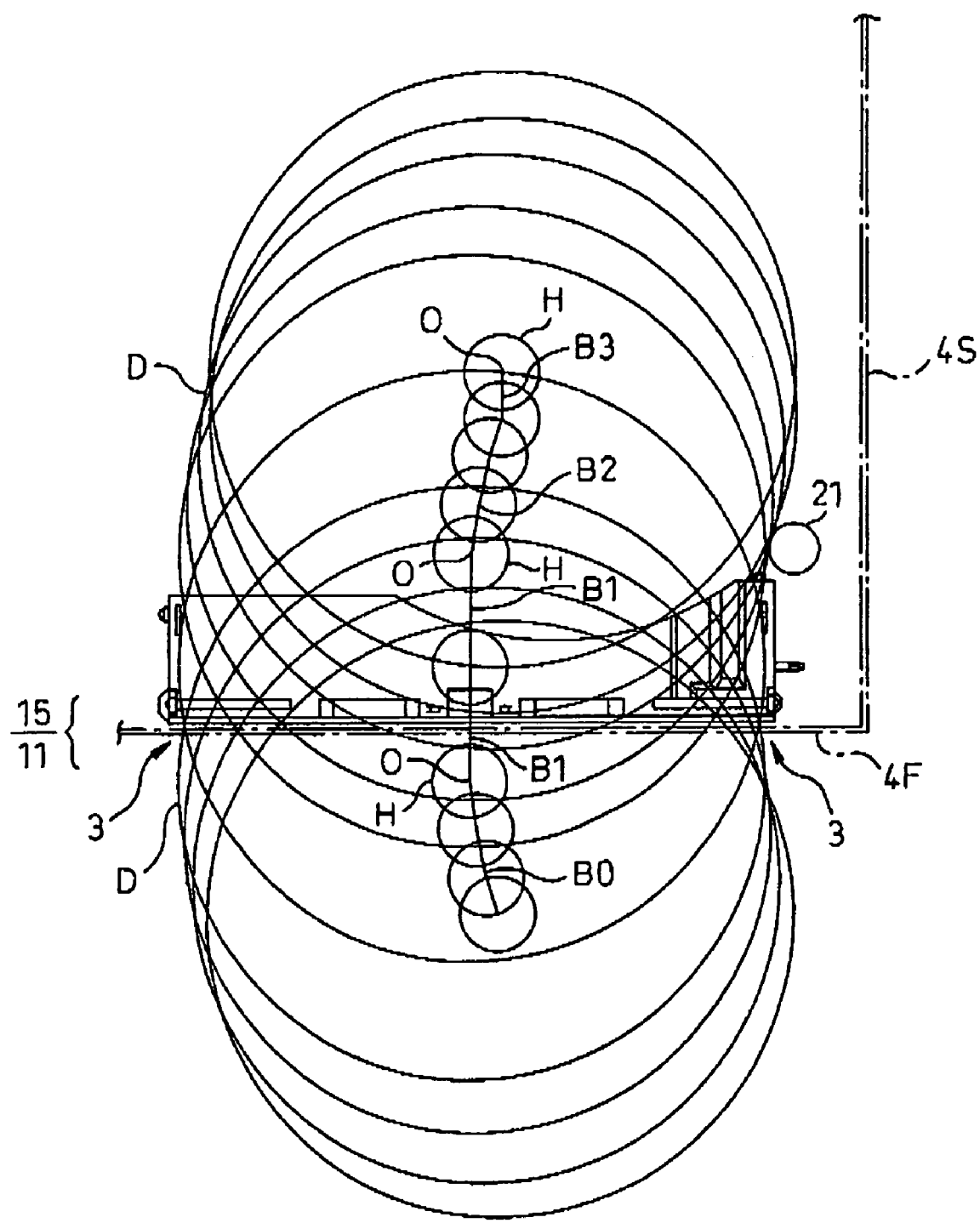
FIG. 8 is a view of the path of disk loading/ejection.

One routine for determining the envelope shapes (E11, E15) shown in FIGS. 5A and 5B is shown in FIG. 8.

FIG. 8 is a view of the disk loading/ejection path. First, the desired path for loading/ejection of the disk D is determined. Next, the center O of the disk D (center of center hole H in disk D) is made to move along this path. At this time, the two ends (L, R) of the disk D shift between the rollers (11, 15). Envelopes are prepared along with this. However, the method of finding the envelopes is not limited to this.

FIG. 8 will be explained in more detail with reference to FIG. 5 as follows.

In FIG. 8, reference numeral 4S (side) indicates a side of the housing 4, while 4F (front) indicates the front of the housing. The front 4F has the opening 3.

The movement starts at the path B0 in the period before the majority of the disk D enters the opening 3, then follows along the path B1->B2->B3. The envelopes are determined based on these paths. Among these paths, B2 corresponds to the loading/ejection direction B shown in FIG. 3. The path B2 has the path B1 and the path B3 before and after it.

The path B1 is substantially straight as shown in FIG. 8. The path B3 is also substantially straight. Both are not accompanied with any curves. To create such straight progression, referring to FIG. 5, first, to create the straight path B1, the envelope of the pair of rollers is made substantially left-right symmetric at the part where the ends (L, R) of the disk D contact the pair of rollers. On the other hand, to create the straight path B3, the envelope of the pair of rollers at the part where the ends (L, R in FIGS. 4A and 4B) of the disk D contact the pair of rollers is also made substantially left-right symmetric. This latter left-right symmetry is a complete left-right symmetry as seen from the envelopes E11 and E15 at the left and right sides of the center C according to the example of FIG. 5.

That is, in the substantially V-sectional shape of the drive roller 11, predetermined ranges to the left and right of the center are made left-right symmetric in shape. More preferably, in the substantially V-sectional shape of the drive roller 11, predetermined ranges at the left end part and the right end part of the drive roller are also made left-right symmetric in shape.

Further, in the substantially V-sectional shape of the holding part 11, predetermined ranges to the left and right of the center are made left-right symmetric in shape. More preferably, in the substantially V-sectional shape of the holding part 15, predetermined ranges at the left end part and the right end part of the holding part are also made left-right symmetric in shape.

The straight paths B1 and B3 are generated in this way for the following reasons. First, regarding B1, when the user loads a disk D from the opening 3, if the disk D were pulled in curved when being pulled into the housing 4 at that time, the user would feel something strange at his hand and would therefore feel uncomfortable. That is, having the disk D be pulled straight from the user's hand gives the user a pleasant loading feeling. Therefore, the straight path B1 is introduced.

On the other hand, regarding the straight path B3, when the disk D finally enters the disk holding member 5, as will be understood from FIG. 3, the disk D will not fit perfectly there less entering the disk holding member 5 while heading straight toward the deepest part (deepest part of U-shaped member 5). Therefore, the straight path B3 is required.

The offset drive function unit 10 of FIG. 1 in the first embodiment was explained above. The inside movement limiting function unit 12 of FIG. 1 in the first embodiment will be explained here.

The inside movement limiting function unit 12 is an inside abutting part 21 shown in FIG. 3 in the first embodiment.

That is, the inside abutting part 21 holds the loading/ejection path in an arc shape by having the outer circumference of the disk-shaped storage medium D follow along the inside of an arc when the left-right asymmetry causes the center O of the disk-shaped storage medium D to draw an arc-shaped loading/ejection path.

Therefore, this inside abutting part 21 is preferably arranged at or near the center of the circle forming the arc-shaped loading/ejection path. This disposition will become clearer by referring to FIG. 8. At the right center of FIG. 8, this inside abutting part is shown by reference numeral 21. Specific shapes will be explained below.

As the inside abutting part 21, a first and second type may be considered.

Figure 9A:
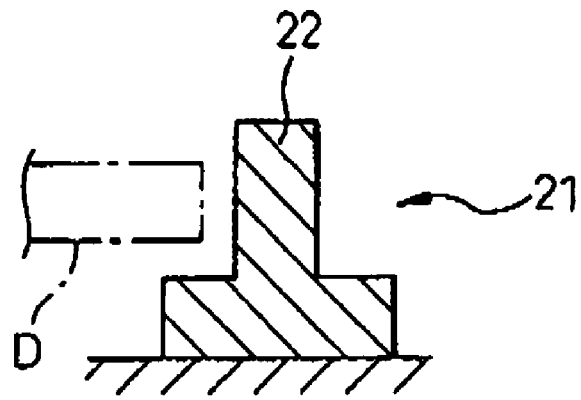
FIGS. 9A, 9B, and 9C are sectional views showing three examples of the first embodiment of an inside abutting part 21.
Figure 9B:
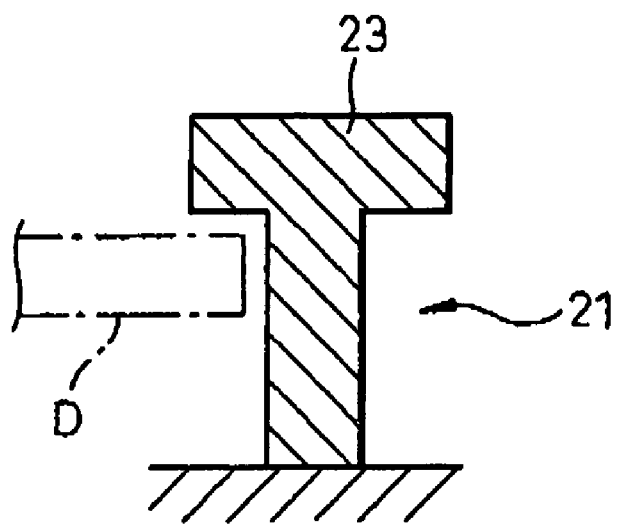
Figure 9C:
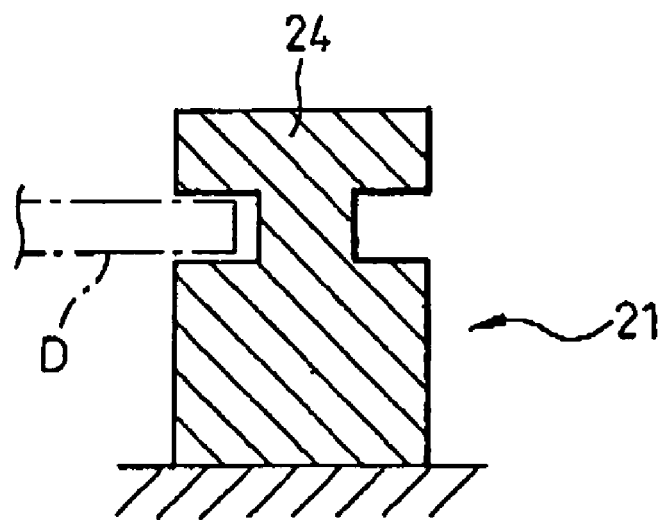

FIGS. 9A, 9B, and 9C are sectional views showing three examples of the first type of inside abutting part 21.

This first type of inside abutting part 21 is a stationary column having a groove against which at least one of the top surface and bottom surface of the outer circumference of the disk-shaped storage medium D can slidingly abut.

FIG. 9A shows a stationary column 22 having a groove against which the bottom surface of the outer circumference of the disk D can slidingly abut, FIG. 9B shows a stationary column 23 having a groove against which the top surface of the outer circumference of the disk D can slidingly abut, and FIG. 9C shows a stationary column 24 having a groove against which both the top surface of the outer circumference and the bottom surface of the outer circumference of the disk D can slidingly abut.

Figure 10A:
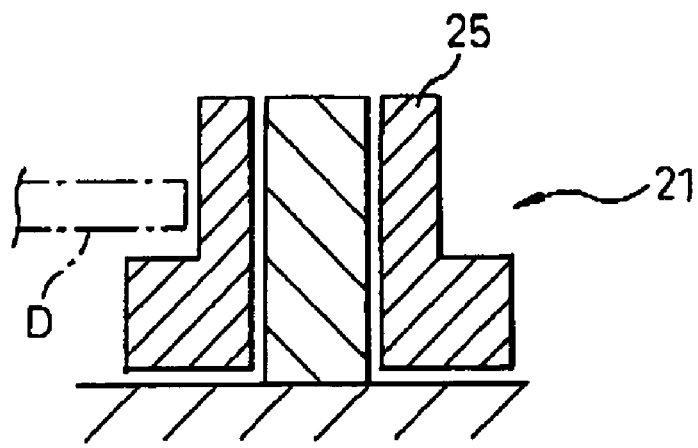
FIGS. 10A, 10B, and 10C are sectional views showing three examples of a second embodiment of an inside abutting part 21.
Figure 10B:
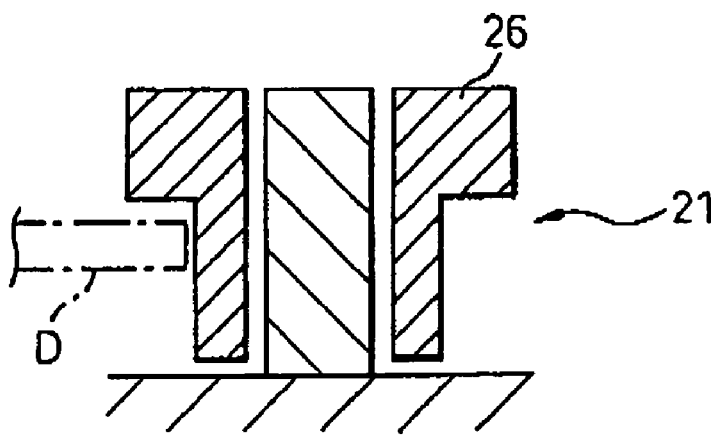
Figure 10C:
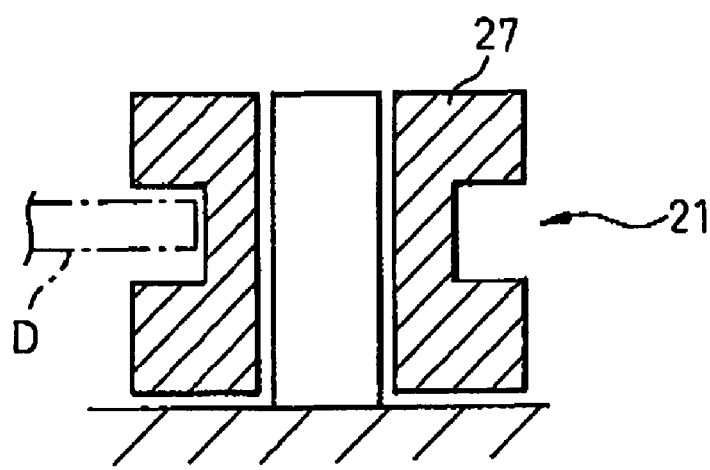

FIGS. 10A, 10B, and 10C are sectional views showing three examples of the second type of the inside abutting part 21.

This second type of inside abutting part 21 is a pulley against which at least one of the top surface and bottom surface of the outer circumference of the disk-shaped storage medium D can rotatably abut.

FIG. 10A shows a pulley 25 against which the bottom surface of the outer circumference of the disk D can rotatably abut, FIG. 10B shows a pulley 26 against which the top surface of the outer circumference of the disk D can rotatably abut, and FIG. 10C shows a pulley 26 against which both the bottom surface of the outer circumference and the top surface of the outer circumference of the disk D can rotatably abut.

Second Embodiment

Figure 11A:
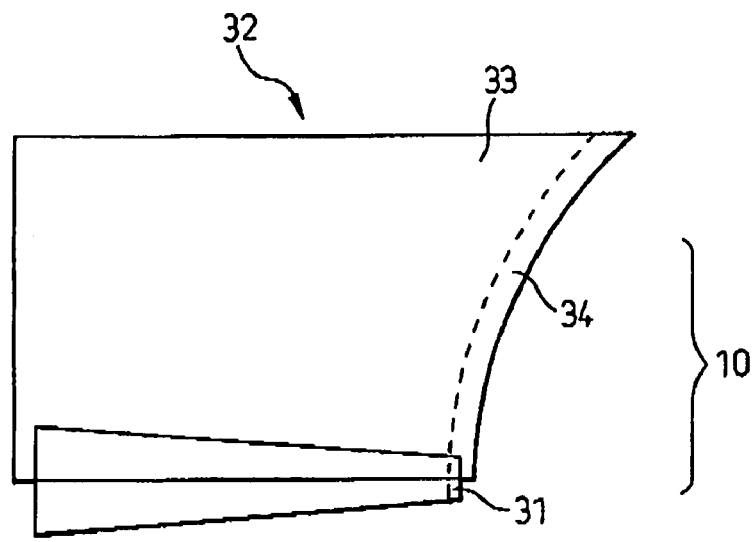
Figure 11B:
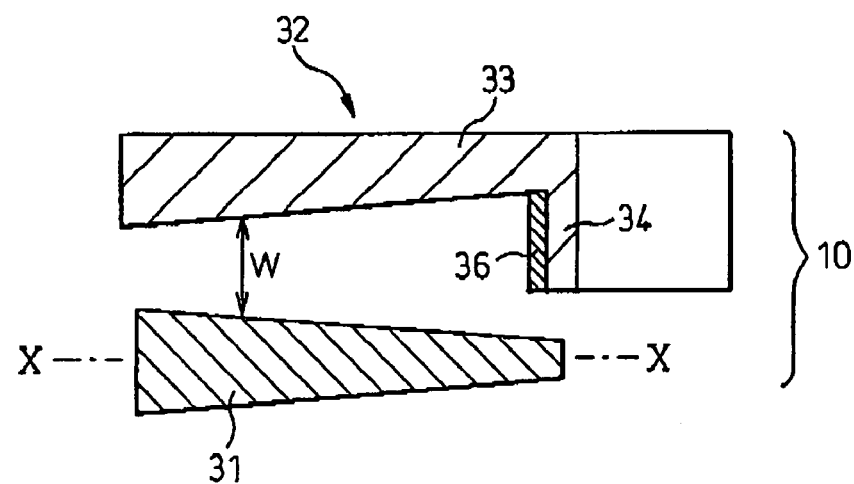
FIG. 11B is a front sectional view of the same.

FIG. 11A is a plan view showing a second embodiment of the present invention, while FIG. 11B is a front sectional view of the same. Note that to facilitate understanding, parts which originally are not visible are also drawn by solid lines.

As shown in the drawings, the offset drive function unit 10 in the second embodiment is comprised of an offset loading/ejection drive part (loading/ejection roller) 31 giving a drive force for inserting and taking out the disk-shaped storage medium D and a guide part 32 paired with the loading/ejection roller (31) and gripping the disk-shaped storage medium D in a transportable manner. At this time, the width (W) in the vertical plane passing through the axis (X-X) of the loading/ejection roller (31) forming a space between the cross-sections of the loading/ejection roller (31) and guide part 32 taken along that vertical plane is made to increase gradually the further toward the offset direction along the axis (X-X) of the loading/ejection roller (31).

Here the guide part 32 is comprised of a guide plate 33 extending horizontally along the above loading/ejection direction (B in FIG. 3) and an inside guide rail 34 for pulling and moving the outer circumference of the disk-shaped storage medium D at the inside of an arc to hold the loading/ejection path in an arc shape when the drive of the loading/ejection roller (31) causes the center O of the disk-shaped storage medium D to draw a substantially arc-shaped loading/ejection path.

In the above explanation, the part of the guide part 32 facing the loading/ejection roller (offset loading/ejection drive part 31) was made the guide plate 33, but as a modification of the second embodiment, this facing member may also be made a guide roller. This is shown in FIGS. 12A and 12B.

Figure 12A:
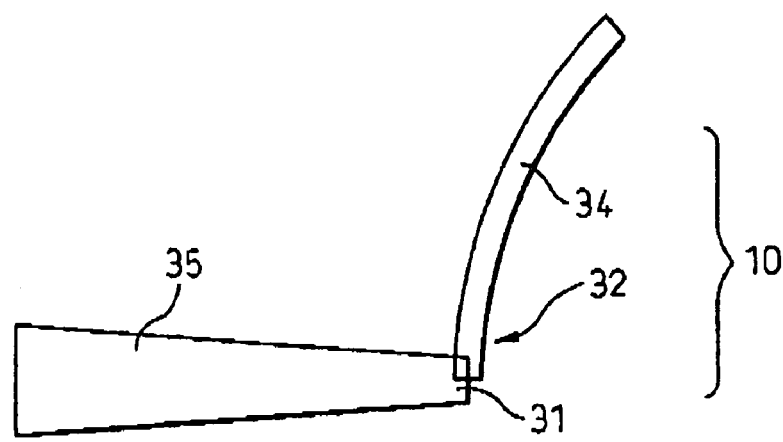
Figure 12B:
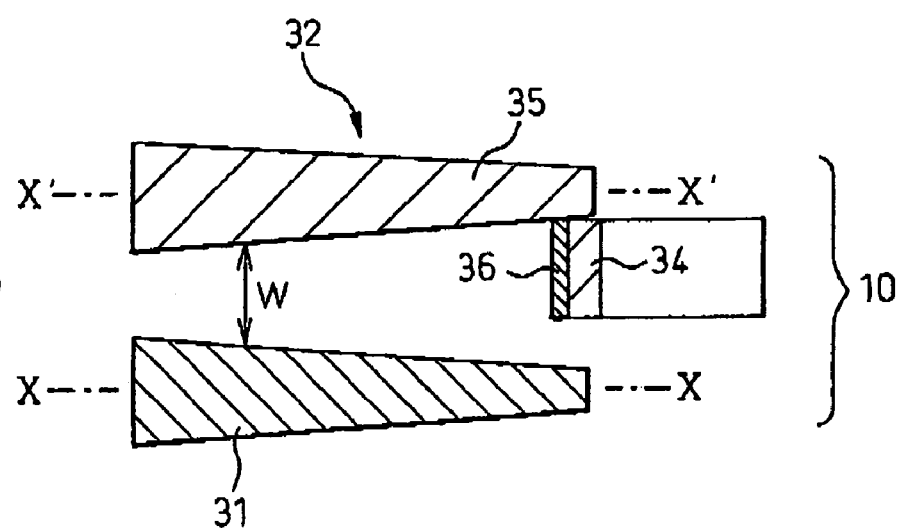
FIG. 12B is a front sectional view of the same.

FIG. 12A is a plan view showing a modification of the second embodiment of the present invention, while FIG. 12B is a front sectional view of the same.

As shown in FIGS. 12A and 12B, the guide part 32 in the modification of the second embodiment is comprised of a guide roller 35 which rotates while gripping the disk-shaped storage medium D with the loading/ejection roller (31) and an inside guide rail 34 which pulls and moves the outer circumference of the disk-shaped storage medium D along the inside of an arc and holds the loading/ejection path at an arc shape when drive of the loading/ejection roller (31) causes the center O of the disk-shaped storage medium to draw a substantially arc-shaped loading/ejection path.

In the second embodiment (FIGS. 11A and 11B and FIGS. 12A and 12B), the offset loading/ejection drive part 31 and the guide plate 33 or guide roller 35 of the guide part 32 transport the disk D gripped by them so as to draw a curved loading/ejection path.

However, the path drawn due to this transport alone will not be an accurate, stable arc. Therefore, the movement of the disk D is linked with the inside guide rail 34 of the guide part 32 as well so as to forcibly correct the path of the disk D to an arc shape.

At this time, the outer circumference of the disk D moves while being pulled along the inside guide rail 34, so the surface of the inside guide rail 34 contacting the outer circumference of the disk D is treated to prevent sliding. This pulling force and antislip force work together so that the disk D firmly runs along the inside guide rail 34 side. For this reason, the inside surface of the inside guide rail 34 is preferably provided with a rubber member 36 of a suitable hardness. Note that the previously mentioned rollers (11, 31) are also preferably made of rubber.

Third Embodiment

The third embodiment can be applied in common to the above first embodiment and second embodiment and relates to the outside movement limiting function unit 13 shown in FIG. 1.

As explained above, the outside movement limiting function unit 13 is a final path correcting function unit for making the loading/ejection path of the disk D reliably approach an arc-shaped path (B). It provides beneficial functions in addition to this path correction function too. This third embodiment will be explained with reference to the drawings.

FIGS. 13A, 13B, 13C, and 13D are plan views for explaining the third embodiment of the present invention and show four processes when the disk D is loaded from the opening 3. To facilitate understanding, however, the processes are assumed to start from (13D), proceed through (13D)-> (13C)-> (13B)->and end at (13A).

As shown in FIGS. 13A to 13D, provision is made of an outside movement limiter (41) (see 3 in FIG. 1) holding the loading/ejection path in an arc shape by having the outer circumference of the disk-shaped storage medium D follow the outside of an arc when the aforementioned offset (B) causes the center O of the disk-shaped storage medium D to draw an arc-shaped loading/ejection path. This is the characterizing feature of the third embodiment.

Figure 13A:
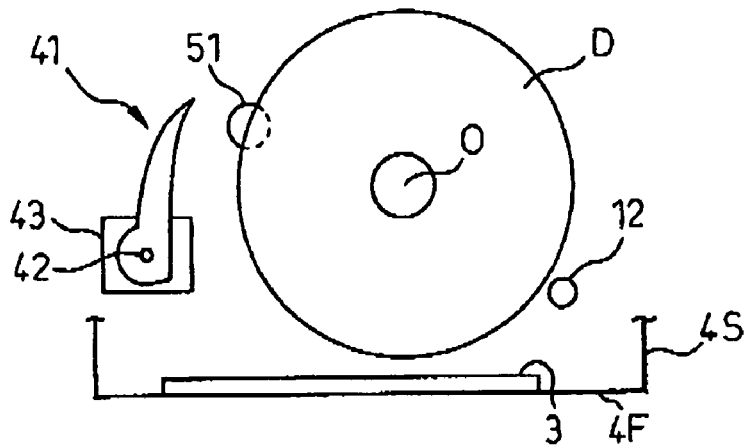
FIGS. 13A, 13B, 13C, and 13D are plan views for explaining a third embodiment of the present invention.
Figure 13B:
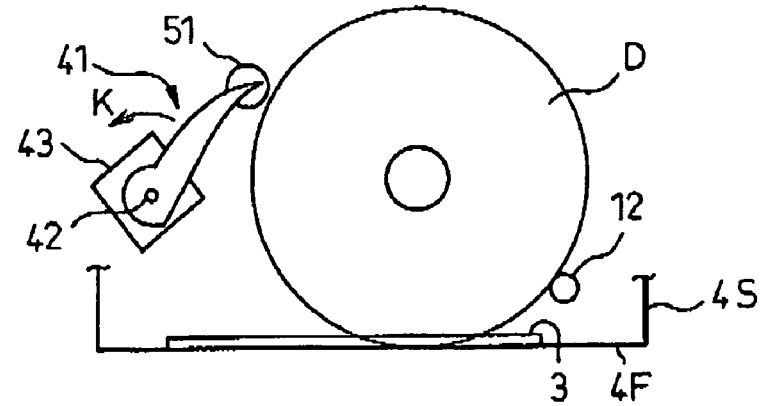
Figure 13C:
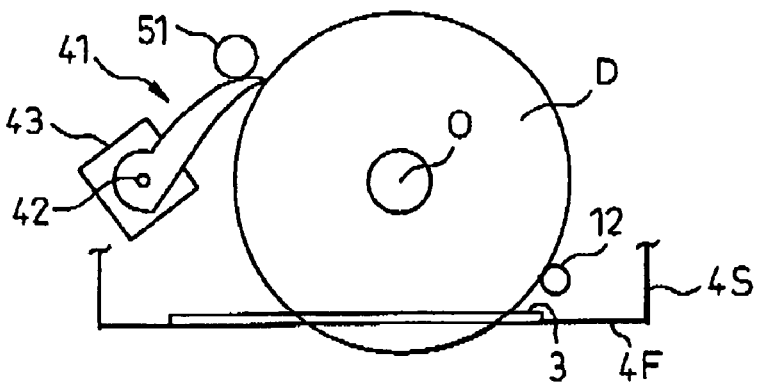
Figure 13D:
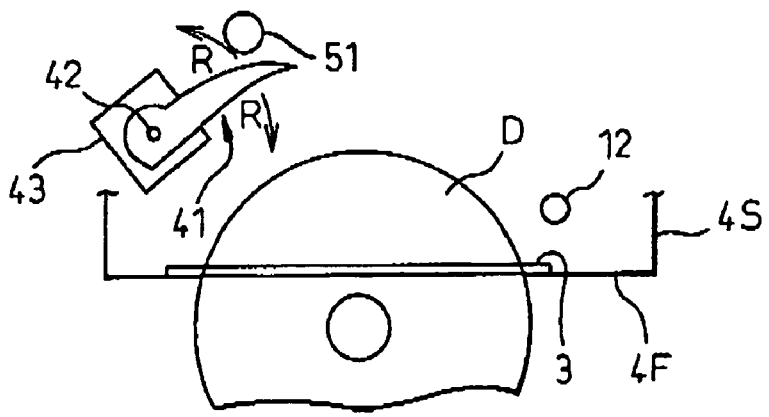

As the outside movement limiter 41, a guide rail, guide roller, or other various parts may be used, but according to the example shown in FIGS. 13A to 13D, the outside movement limiter 41 is comprised of a lever with one end axially supported by a shaft 42 and with another end able to swing freely in the radial direction R of the disk-shaped storage medium D (see FIG. 13D).

Initially, the outer circumference of the disk D does not contact the lever (41) (13D), but when the disk D is further sent into the housing 4, the lever (41) contacts the outer circumference of the disk D. The effect of correction of the outside path appears here. Note that for example a coil spring is attached coaxially to bias the lever (41) to the disk D side at all times.

In this way, the disk moves to the state of FIG. 13C while being corrected in path. That is, the outside movement limiter 41 is pressed against the outer circumference of the disk-shaped storage medium D whereby its other end moves to a predetermined position (14C). A detecting function unit is provided for detecting that position (14C). This detecting function unit is shown by reference numeral 41 in the figure and specifically is a so-called "limit switch". This limit switch may be a mechanical switch contacting the other end of the lever (41), but may also be a magnetic type or optical type non-contact switch. The points to note in FIG. 13C are as follows.

That is, provision is made of an inside movement limiting function unit 12 (21 to 27, 34) for holding a loading/ejection path in an arc shape by having the outer circumference of the disk D follow along the inside of an arc shape when the center O of the disk D draws an arc-shaped loading/ejection path. The distance between the inside movement limiting function unit 12 and the above predetermined position (13C) is set to be slightly smaller than the diameter of the disk D.

After setting the distance in this way, when the limit switch (51) detects arrival of the outer circumference of the disk D at a predetermined position (13C), the drive of the offset movement function unit (drive roller, loading/ejection roller) 10 is stopped.

Substantially simultaneously with this, a lever movable holder 43 is changed slightly in orientation in the counter-clockwise direction K as shown by FIG. 13B. Along with this, the lever (41) as a whole also changes in orientation slightly in this direction. Therefore, the clearance between the front end of the lever (41) and the inside movement limiting function unit 12 widens somewhat and the disk D gently makes a soft landing in a disk holding member 5 (FIG. 3) through its prior inertia.

In this way, temporarily stopping the disk D from entering a disk holding member 5 all at once right before it enters, as shown in FIG. 13C showing the state right before FIG. 13B, has important significance. This will be explained below.

In the process of the user loading a disk D from the opening 3, sometimes the user will mistakenly load a second disk right after a previously loaded disk. If a second disk is mistakenly loaded in this way, it will obstruct subsequent disk processing operations.

Therefore, when one disk D approaches a disk holding member 5 and is about to be completely pulled into it, it is stopped once. This is to prevent two disks from erroneously being pulled in from the opening 3 and thereby prevent the above erroneous operation (simultaneous loading of two disks) in advance.

When the loading (and ejection) operation of the disk D is completely finished, next the playback (recording) pickup PU (FIG. 14) performs a predetermined operation on the disk D. At this time, the lever (41) has to be kept from interfering with this operation.

Therefore, after the detecting function unit 51 detects said predetermined position (13C), the other end of the outside movement limiter 41 can move further outward from that predetermined position. The lever movable holder 43 may be made to rotate further in the direction K as shown from FIG. 13B to FIG. 13A.

Note that the outside movement limiter 41 and the detecting function unit 51 shown in FIGS. 13A to 13D are drawn to facilitate understanding of their functions. The actual disk device differs from the configuration and layout shown in FIGS. 13A to 13D.

Summarizing the industrial applicability of the invention, the present invention can be applied to audio systems or computer systems etc. where a plurality of disk-shaped storage media are stored in a single housing and any of them is automatically loaded, played back/recorded, and then ejected. It is particularly advantageous for reducing the size of the system.

While the invention has been described with reference to specific embodiments chosen for purpose of illustration, it should be apparent that numerous modifications could be made thereto by those skilled in the art without departing from the basic concept and scope of the invention.

What is claimed is:

1. A loading/ejection mechanism for a disk-shaped storage medium for inserting and taking out the disk-shaped storage medium through an opening formed in part of a housing comprising:
   an offset drive function unit for shifting a loading/ejection direction, when inserting and taking out the disk-shaped storage medium through said opening, to a loading/ejection direction offset from a straight direction perpendicularly intersecting an opening direction of the opening, wherein
   said offset drive function unit includes an offset loading/ejection drive part providing a drive force for inserting and taking out said disk-shaped storage medium,
   said offset loading/ejection drive part is comprised of a drive roller, and wherein
   the drive roller is given a substantially V-sectional shape by gradually increasing a radius of said drive roller toward left and right directions from a center along an axial direction of said drive roller.

2. A loading/ejection mechanism as set forth in claim 1, wherein said substantially V-sectional shape of said drive roller is left-right asymmetric in shape from said center.

3. A loading/ejection mechanism as set forth in claim 1, wherein said substantially V-sectional shape of said drive roller is left-right symmetric in shape from said center.

4. A loading/ejection mechanism as set forth in claim 1, wherein in said substantially V-sectional shape of said drive roller, predetermined ranges to the left and right of said center are made left-right symmetric in shape from said center.

5. A loading/ejection mechanism as set forth in claim 1, wherein in said substantially V-sectional shape of said drive roller, predetermined ranges at a left end part and a right end part of said drive roller are made left-right symmetric in shape.

6. A loading/ejection mechanism as set forth in claim 1, wherein
   said offset drive function unit includes a holding part paired with said drive roller to grip said disk-shaped storage medium in a transportable manner, and
   said holding part is given a substantially V-sectional shape at a side facing said drive roller.

7. A loading/ejection mechanism as set forth in claim 6, wherein said substantially V-sectional shape of said holding part is left-right asymmetric in shape from said center.

8. A loading/ejection mechanism as set forth in claim 6, wherein said substantially V-sectional shape of said holding part is left-right symmetric in shape from said center.

9. A loading/ejection mechanism as set forth in claim 6, wherein in said substantially V-sectional shape of said holding part, predetermined ranges to the left and right of said center are made left-right symmetric in shape from said center.

10. A loading/ejection mechanism as set forth in claim 6, wherein in said substantially V-sectional shape of said holding part, predetermined ranges at a left end part and a right end part of said holding part are made left-right symmetric in shape.

11. A loading/ejection mechanism as set forth in claim 6, wherein said holding part is a holding plate or a holding roller.

12. A loading/ejection mechanism as set forth in claim 6, wherein said offset drive function unit further includes a pressing part for providing a pressing force to grip said disk-shaped storage medium with said holding part while maintaining said offset loading/ejection drive part parallel with said pressing part.

13. A loading/ejection mechanism as set forth in claim 6, further comprising an inside abutting part for holding a loading/ejection path in an arc shape by causing the outer circumference of said disk-shaped storage medium follow the inside of an arc when a center of said disk-shaped storage medium draws a substantially arc-shaped loading/ejection path.

14. A loading/ejection mechanism as set forth in claim 13, wherein said inside abutting part is arranged at or near a center of a circle forming said arc-shaped loading/ejection path.

15. A loading/ejection mechanism as set forth in claim 13, wherein said inside abutting part is a stationary column having a groove against which, at least one of a top surface and a bottom surface of the outer circumference of said disk-shaped storage medium can slidingly abut.

16. A loading/ejection mechanism as set forth in claim 13, wherein said inside abutting part is a pulley against which, at least one of a top surface and a bottom surface of the outer circumference of the disk-shaped storage medium can rotatably abut.

17. A loading/ejection mechanism as set forth in claim 13, wherein
   said offset drive function unit is comprised of an offset loading/ejection drive part providing a drive force for inserting and taking out said disk-shaped storage medium and a guide part paired with said offset loading/ ejection drive part for gripping the disk-shaped storage medium in a transportable manner, and a width in a vertical plane passing through the axis of the offset loading/ejection drive part forming a space between the cross-section of the offset loading/ejection drive part and a cross-section of a guide part taken along said vertical plane is configured to increase gradually toward the offset direction along the axis of the offset loading/ejection drive part.

18. A loading/ejection mechanism as set forth in claim 17, wherein said guide part is comprised of a guide plate extending horizontally along said loading/ejection direction and an inside guide rail for pulling and moving an outer circumference of said disk-shaped storage medium at an inside of an arc to hold the loading/ejection path in said arc shape, when the offset loading/ejection drive part causes the center of the disk-shaped storage medium to draw said substantially arc-shaped loading/ejection path.

19. A loading/ejection mechanism as set forth in claim 17, wherein said guide part is comprised of a guide roller which rotates while gripping said disk-shaped storage medium with said offset loading/ejection drive part and an inside guide rail which pulls and moves an outer circumference of said disk-shaped storage medium along an inside of an arc and holds the loading/ejection path at said arc shape, when the offset loading/ejection drive part causes the center of the disk-shaped storage medium to draw said substantially arc-shaped loading/ejection path.

20. A loading/ejection mechanism as set forth in claim 18 or 19, wherein a surface of said inside guide rail contacting the outer circumference of said disk-shaped storage medium is configured to prevent sliding.

21. A loading/ejection mechanism as set forth in claim 1, further comprising an outside movement limiter holding the loading/ejection path in an arc shape by having an outer circumference of said disk-shaped storage medium follow an outside of an arc, when said offset causes a center of said disk-shaped storage medium to draw an arc-shaped loading/ejection path.

22. A loading/ejection mechanism as set forth in claim 21, wherein said outside movement limiter has one end axially supported and another end configured to swing freely in a radial direction of said disk-shaped storage medium.

23. A loading/ejection mechanism as set forth in claim 21, further comprising a detecting function unit for detecting when said outside movement limiter is pressed against the outer circumference of said disk-shaped storage medium, and said another end moves to a predetermined position to stop said offset drive function unit from providing said drive force.

24. A loading/ejection mechanism as set forth in claim 23, further comprising an inside movement limiting function unit for holding a loading/ejection path in an arc shape by causing the outer circumference of said disk-shaped storage medium follow along an inside of an arc shape, when a center of said disk-shaped storage medium draws an arc-shaped loading/ejection path, and the distance between said inside movement limiting function unit and the predetermined position is set to be slightly smaller than a diameter of said disk-shaped storage medium.

25. A loading/ejection mechanism as set forth in claim 23, wherein after the detecting function unit detects said predetermined position, said another end of said outside movement limiter is capable of moving further outward from said predetermined position.

26. A disk device provided with a loading/ejection mechanism for a disk-shaped storage medium as set forth in any one of claims 1.

27. A disk autochanger provided with a loading/ejection mechanism for a disk-shaped storage medium as set forth in any one of claims 1.

* * * * *